(12) United States Patent
Lin

(10) Patent No.: US 10,081,381 B2
(45) Date of Patent: Sep. 25, 2018

(54) SHOPPING CART

(71) Applicant: Fuze Lin, Guangzhou (CN)

(72) Inventor: Fuze Lin, Guangzhou (CN)

(*) Notice: Subject to any disclaimer, the term of this patent is extended or adjusted under 35 U.S.C. 154(b) by 0 days.

(21) Appl. No.: 15/373,606

(22) Filed: Dec. 9, 2016

(65) Prior Publication Data
US 2017/0088154 A1    Mar. 30, 2017

Related U.S. Application Data

(63) Continuation-in-part of application No. PCT/CN2014/079630, filed on Jun. 10, 2014.

(51) Int. Cl.
| *B62B 1/00* | (2006.01) |
| *B62B 3/02* | (2006.01) |
| *B62B 5/00* | (2006.01) |

(52) U.S. Cl.
CPC .............. *B62B 3/027* (2013.01); *B62B 3/022* (2013.01); *B62B 3/025* (2013.01); *B62B 5/0003* (2013.01)

(58) Field of Classification Search
CPC ......... B62B 3/027; B62B 3/022; B62B 3/025; B62B 3/18; B62B 3/14; B62B 3/00; B62B 3/02; B62B 3/08; B62B 5/0003
See application file for complete search history.

(56) References Cited

U.S. PATENT DOCUMENTS

| 2,133,834 A | * | 10/1938 | Sheldon | B62B 3/1464 |
| | | | | 280/33.995 |
| 3,082,016 A | * | 3/1963 | Pratt | B62B 5/0003 |
| | | | | 280/641 |
| 3,168,328 A | * | 2/1965 | Hill, Sr. | B62B 1/002 |
| | | | | 280/47.18 |
| 4,199,170 A | * | 4/1980 | Hubner | B62B 3/02 |
| | | | | 280/641 |
| 4,251,178 A | * | 2/1981 | Bourgraf | B60R 5/04 |
| | | | | 414/343 |
| 4,369,985 A | * | 1/1983 | Bourgraf | B62B 3/02 |
| | | | | 280/43.1 |

(Continued)

FOREIGN PATENT DOCUMENTS

| CN | 2794959 Y | 7/2006 |
| DE | 9315155 U1 | 12/1993 |

(Continued)

*Primary Examiner* — James M Dolak
(74) *Attorney, Agent, or Firm* — Price Heneveld LLP

(57) ABSTRACT

A shopping cart comprises a support seat provided therein with tracks, and a support frame supporting the support seat. The support frame comprises a first support frame and a second support frame disposed across each other and rotatably connected. Bottoms of the first and second support frames are installed with wheels; and tops thereof are installed in and movable along the tracks. When in use, by moving the tops of the first support frame and the second support frame respectively to two ends of the tracks to press against them and placing goods on the support seat, the goods can be carried freely without handbags, greatly saving physical strength and being convenient and efficient; and when not in use, the shopping cart can be folded and placed in a trunk of a vehicle for later use, thus occupying small room due to the small size and being convenient to carry.

18 Claims, 16 Drawing Sheets

(56) References Cited

U.S. PATENT DOCUMENTS

| | | | | |
|---|---|---|---|---|
| 6,431,319 B1* | 8/2002 | Myers | ............... | B62B 3/02 |
| | | | | 187/243 |
| 6,471,236 B1* | 10/2002 | Eskridge | ............... | B62B 1/12 |
| | | | | 280/641 |
| 8,075,016 B2* | 12/2011 | Silberberg | ............ | B62B 5/0003 |
| | | | | 280/43 |
| 8,172,256 B2* | 5/2012 | Fine | ............... | B62B 3/027 |
| | | | | 280/38 |
| 8,408,581 B1* | 4/2013 | Hunter | ............... | B62B 3/027 |
| | | | | 280/33.993 |
| 8,844,949 B2* | 9/2014 | White | ............... | B62B 5/067 |
| | | | | 280/38 |
| 9,050,988 B1* | 6/2015 | McLeod | ............... | B62B 3/022 |
| 9,174,659 B2* | 11/2015 | Stauff | ............... | B62B 3/1404 |
| 9,573,611 B2* | 2/2017 | Coyle | ............... | B62B 3/027 |
| 9,731,742 B2* | 8/2017 | Stauff | ............... | B62B 3/1404 |
| 9,849,582 B2* | 12/2017 | Cheff | ............... | B25H 1/04 |
| 9,944,304 B2* | 4/2018 | Sherman | ............... | B62B 3/14 |
| 9,956,977 B2* | 5/2018 | Kubo | ............... | B62B 3/02 |
| 2002/0011719 A1 | 1/2002 | Eskridge | | |
| 2008/0018078 A1 | 1/2008 | Van Landingham, Jr. et al. | | |
| 2014/0035262 A1 | 2/2014 | White et al. | | |

FOREIGN PATENT DOCUMENTS

| | | |
|---|---|---|
| DE | 102004062906 A1 | 6/2006 |
| EP | 0286520 A1 | 10/1988 |

\* cited by examiner

SHOPPING CART

CROSS-REFERENCE TO RELATED APPLICATION

This application is a continuation-in-part of International Application No. PCT/CN2014/079630, filed Jun. 10, 2014, which is hereby incorporated by reference in its entirety.

TECHNICAL FIELD

The present invention relates to a shopping tool, and particularly to a shopping cart.

BACKGROUND ART

At present, most people in cities tend to buy most of their weekly food and household items on a certain day of a week, but it is quite labor-consuming due to numerous articles purchased during shopping as well as the need to carry the articles to their cars.

Consequently, shopping carts are available for customers in almost all supermarkets. However, the whole process, from borrowing a shopping cart, transporting the articles to their cars, returning the shopping cart, to transferring the articles from the cars to kitchens when arriving home, is tedious, inefficient and quite labor-consuming. Particularly for the elderly and infirm, it is difficult to complete this task. Meanwhile, it is not environmentally friendly to use a lot of plastic bags.

DISCLOSURE OF THE INVENTION

In view of this, the present invention is to provide a shopping cart, which is convenient for shopping and foldable so as to be used cooperatively with a trunk of a vehicle, to overcome the defects in the prior art.

The technical solutions thereof are as follows: a shopping cart, comprising a support seat and a support frame configured for supporting the support seat, wherein the support seat is provided therein with tracks, the support frame comprises a first support frame and a second support frame, the first support frame and the second support frame are disposed across each other and rotatably connected; both bottoms of the first support frame and bottoms of the second support frame are installed with wheels; a top of the first support frame and a top of the second support frame both are installed in the tracks, and both the top of the first support frame and the top of the second support frame are movable along the tracks.

The technical solutions are further illustrated below.

Preferably, the support seat is installed with a handle frame, and the shopping cart further comprises pressing units configured for pressing the support frame, wherein the pressing units are close to the handle frame and located at one end portion of each of the tracks.

Preferably, the pressing unit comprises a pressing member and first springs, wherein the pressing member is movable perpendicularly to a direction of the track, the first springs are arranged between the pressing member and the support seat, and the track, corresponding to the position of the pressing member, is provided with at least one clamping groove configured for engaging the support frame.

Preferably, the at least one clamping groove comprises more than one clamping groove serially arranged on an upper side of the track; a lower side of the track corresponding to the positions of the clamping grooves is provided with a recess, the recess has a first flange, the pressing member is embodied as a cover body, a rabbet of the cover body has a second flange, a bottom of the cover body is located outside the recess, the second flanges are located in the recess, and the first springs are located between the bottom of the cover body and the recess.

Preferably, the first support frame comprises a first cross bar and two first support rods located at both ends of the first cross bar, one end of each of the two first support rods is fixedly connected with the first cross bar, and the other end of each of the two first support rods is installed with the wheels; the second support frame comprises a second cross bar and two second support rods located at both ends of the second cross bar, one end of each of the two second support rods is fixedly connected with the second cross bar, and the other end of each of the two second support rods is installed with the wheels; and both the first cross bar and the second cross bar are installed in the tracks, the first support rod and the second support rod are rotatably connected with each other, and the first cross bar, compared to the second cross bar, is closer to the clamping grooves.

Preferably, the second support rod comprises a first connecting rod, a second connecting rod rotatably connected with the first connecting rod, and a rotation limiting structure, wherein the first connecting rod and the second connecting rod are connected through the rotation limiting structure.

Preferably, each of the second support rods comprises the first connecting rod, the second connecting rod, a fastening rod, a second spring, an unlocking rod and a third spring, both the first connecting rod and the second connecting rod are provided with through holes configured for allowing the fastening rod to pass through; the fastening rod is located within the through holes and movable along the through holes, both ends of the fastening rod have a protrusion pressing against the through hole, the third spring is sleeved on the fastening rod and located between the protrusion and the first connecting rod or the second connecting rod, the first connecting rod has a locking element, and the second connecting rod has a locking hole matching the locking element; and the unlocking rod has a diameter variation section, and the variation section is provided between the first connecting rod and the second connecting rod, and presses against the first connecting rod and the second connecting rod; and the unlocking rod has an end cover at an end, and the second spring is sleeved outside the unlocking rod, and located between the end cover and the first connecting rod or the second connecting rod.

Preferably, a leaf spring is arranged between the first connecting rod and the second connecting rod, wherein the leaf spring and the locking element are rotatably connected with each other, and the diameter variation section is located between the locking element and the second connecting rod.

Preferably, a third cross bar is connected between the two first support rods or between the two second support rods.

Preferably, the support seat is detachably installed thereon with a shopping basket.

Preferably, the support seat is formed by a U-shaped circular tube and two angle irons, wherein the U-shaped circular tube comprises two vertical tube portions and a horizontal tube portion, portions where the vertical tube portions are joined to the horizontal tube portion are bent in parallel to each other, the angle irons are mounted on the U-shaped circular tube and parallel to the vertical tube portions, and the handle frame is mounted at an opening end of the U-shaped circular tube.

Preferably, the first support frame comprises a first cross bar and two first support rods located at both ends of the first cross bar, one end of each of the two first support rods is fixedly connected with the first cross bar, and the other end of each of the two first support rods is installed with the wheel; the second support frame comprises a second cross bar and two second support rods located at both ends of the second cross bar, one end of each of the two second support rods is fixedly connected with the second cross bar, and the other end of each of the two second support rods is installed with the wheel; both the first cross bar and the second cross bar are installed in the tracks and slidable within the tracks, the second support rod, which is in form of an oval tube, comprises a first connecting rod and a second connecting rod rotatably connected with the first connecting rod and having an arc-shape cut at an upper end, the second cross bar and the first connecting rods are circular tube-shaped and formed integrally, and form an angle with each other, and by inserting the first connecting rods into the arc-shape cut at the upper ends of the second connecting rods and horizontally fixing by rivets, the second cross bar is rotatably connected with the second connecting rods.

Preferably, the first support rods and the second support rods are horizontally fixed by rivets and rotatably connected together, and a third cross bar is connected between the two first support rods.

Preferably, the second cross bar is provided with a left circular position-limiting sliding block and a right circular position-limiting sliding block, respectively, at outer edges of the angle irons at a left side and a right side, and the left circular position-limiting sliding block and the right circular position-limiting sliding block are fixedly connected with the second cross bar through welding.

Preferably, the shopping cart further comprises a height regulating device, the height regulating device comprises an upright base, a retractable arm, a screw rod, a swing arm base and a swing arm, wherein the upright base is fixedly connected onto the angle irons of the support seat; the retractable arm is composed of a tetragonal nut, a circular tube and an arc-shaped pushing arm which are fixedly connected; a radius of a tail end of the screw rod is smaller than that of a main body of the screw rod; the swing arm base is fixedly connected with the screw rod passing through the upright base and is rotatable relative to the upright base; and the swing arm and the swing arm base are rotatably connected.

Preferably, a lock hook is provided at the middle of the first cross bar, and the lock hook is configured to hook the arc-shaped pushing arm of the height regulating device.

Preferably, a protruding pin is provided on a handle of the swing arm, and a bottom plate of the upright base is provided with two pin holes configured for insertion of the protruding pin.

Preferably, a foldable shopping basket is detachably installed on the support seat, and the handle frame is retractable.

Preferably, the handle frame is made of a bent circular tube with a radius smaller than those of the vertical tube portions of the support seat, the handle frame is fixed on the support seat through fixing seats and fastening nuts, and an anti-loosening stopper is provided between the handle frame and the support seat.

Preferably, both the handle frame and the horizontal tube portion of the U-shaped circular tube of the support seat are wrapped with a foam sponge.

The principle, effects, and the like, of the preceding technical solutions are illustrated below:

1. In the present invention, the support frame is composed of a first support frame and a second support frame in rotatable connection. The tops of the first support frame and the second support frame are movable along the tracks. By moving the tops of the first support frame and the second support frame respectively to two ends of the tracks to press against the two ends of the tracks and placing goods on the support seat, the goods can be carried freely without the use of handbags, greatly saving physical strength and being convenient and efficient; and when not being used, the shopping cart of the present invention can be folded and placed in a trunk of a vehicle for later use, thus occupying small room due to the small size and being convenient to carry.
2. The shopping cart of the present invention is additionally provided with the handle frame and the shopping basket. The shopping basket is preferably a foldable shopping basket, and is detachably connected with the support seat, to enhance the use function of the shopping cart while maintaining a small volume, so as to increase the use value of the product and improve user comfort.
3. The second support rod of the second support frame comprises the first connecting rod and the second connecting rod. The first connecting rod and the second connecting rod are rotatably connected with each other and provided with a rotation limiting structure at a joint thereof. By connecting the first connecting rod and the second connecting rod through the rotation limiting structure, the first connecting rod and the second connecting rod are locked. When the goods need to be transported to a trunk of a vehicle, the shopping cart can be pushed to a place close to the trunk of the vehicle, and the unlocking rod of the rotation limiting structure is pushed and pressed on a trunk lid rubber gasket of the trunk of the vehicle, so that the rotation limiting structure is unlocked, and the first connecting rod and the second connecting rod rotate relatively, and at the meantime, a front end of the support seat inclines towards the trunk of the vehicle and presses against a trunk threshold. The shopping basket of the shopping cart is further pushed into the trunk of the vehicle, and at the meantime, after the second cross bar moves towards the first cross bar along the tracks and the shopping cart is pushed into the trunk of the vehicle, the first cross bar and the second cross bar along the tracks are further pushed thereinto, thus completing all steps of putting the shopping cart into the trunk of the vehicle. Thus, the shopping cart of the present invention not only is able to facilitate transportation of goods and occupy a small space (due to being foldable), but also is able to conveniently cooperate with the trunk of the vehicle to be put into the trunk of the vehicle. Therefore, it can greatly save manpower and material sources, and has extremely good market prospects.
4. In the present invention, as the height regulating device is provided, when the shopping cart is being placed in a trunk of a vehicle, the operation will be more convenient and labor-saving, and the use will be more flexible.
5. In the present invention, as the circular position-limiting sliding blocks are provided, rotation of the second cross bar can be limited when the second cross bar is located at the leftmost ends of the tracks, so that the operation is more stable and safe when the shopping cart is in use.

6. In the present invention, both the handle frame and the horizontal tube portion of the U-shaped circular tube of the support seat are wrapped with the foam sponge, so as to provide a buffering function in case of accidental collision, and further improve the use safety of the shopping cart.

7. In the present invention, as the retractable handle frame and the foldable shopping basket are provided, the shopping cart can be used as a small table, which is quite convenient, and further broadens the range of application of the shopping cart.

Reference signs: 100—shopping cart; 10—first support frame; 20—second support frame; 11—first cross bar; 12—first support rod; 21—second cross bar; 211—circular position-limiting sliding block; 2111—gap; 22—second support rod; 221—first connecting rod; 222—second connecting rod; 2211—locking element; 2221—locking hole; 2222—arc-shape cut; 30—rotation limiting structure; 31—unlocking rod; 32—second spring; 33—leaf spring; 34—fastening rod; 35—third spring 40—wheel; 50—handle frame; 501—fastening nut; 502—fixing seat; 503—anti-loosening stopper; 60—third cross bar; 70—support seat; 701—U-shaped circular tube; 7011—angle iron; 7012—vertical tube portion; 7013—horizontal tube portion; 71—track; 72—pressing member; 721—second flange; 73—clamping groove; 74—first spring; 75—first flange; 76—recess; 78—height regulating device; 781—upright base; 7811—pin hole; 782—retractable arm; 783—screw rod; 784—swing arm base; 785—swing arm, 7851—pin; 80—shopping basket; 81—foam sponge; 90—vehicle trunk; 91—trunk lid rubber gasket; and 92—trunk threshold.

DETAILED DESCRIPTION OF EMBODIMENTS

Figure 1:
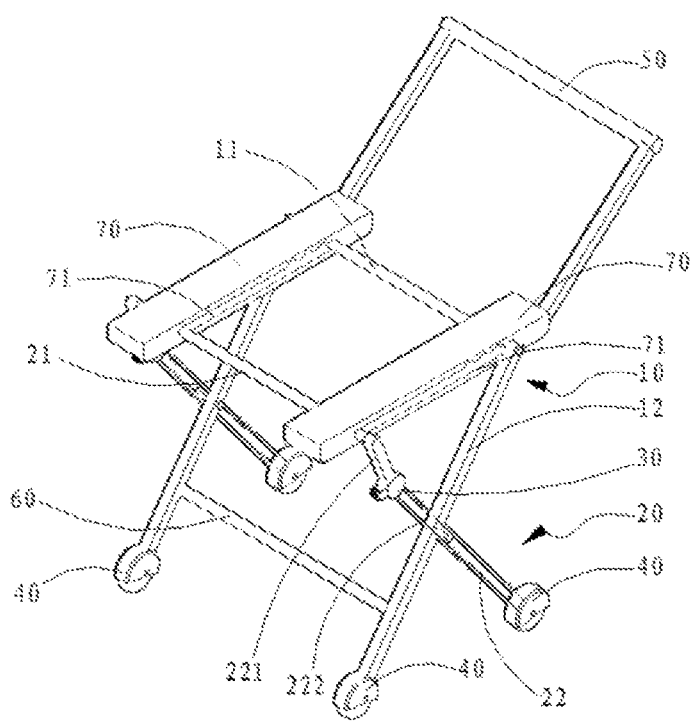
FIG. 1 is a structural schematic diagram of a shopping cart according to the present invention.

Examples of the present invention are described below in detail:

As shown in FIG. 1, the shopping cart 100 of the present invention comprises a support seat 70 and a support frame configured for supporting the support seat 70. The support seat 70 is provided therein with tracks 71. In an example of the present invention, the support seat 70 is configured as two parallel installation blocks, wherein each of the installation blocks is provided with a strip-shaped passage therein, the two strip-shaped passages are in corresponding positions. The two strip-shaped passages form the tracks 71 of the present invention for installing the support frame. The support frame comprises a first support frame 10 and a second support frame 20, wherein the first support frame 10 and the second support frame 20 are disposed across each other and rotatably connected. Bottoms of both the first support frame 10 and the second support frame 20 are installed with wheels 40. Tops of both the first support frame 10 and the second support frame 20 are installed in the tracks 71. The tops of both the first support frame 10 and the second support frame 20 can move along the tracks 71.

The wheels at the bottom of the first support frame can be the same as those at the bottom of the second support frame, or the wheels at the bottom of the first support frame may be different from those at the bottom of the second support frame.

In the present invention, the support frame is constituted by the first support frame 10 and the second support frame 20 in rotatable connection. The tops of the first support frame 10 and the second support frame 20 are movable along the tracks 71. By moving the top of the first support frame 10 and the second support frame 20 respectively to the two ends of the tracks 71 to press against the two ends of the tracks 71 and placing goods on the support seat 70, the goods can be carried freely without the use of handbags, greatly saving physical strength and being convenient and efficient; and when not being used, the shopping cart 100 of the present invention can be folded and placed in a trunk 90 of a vehicle for later use thus occupying small room due to the small size of the shopping cart 100.

Figure 2:
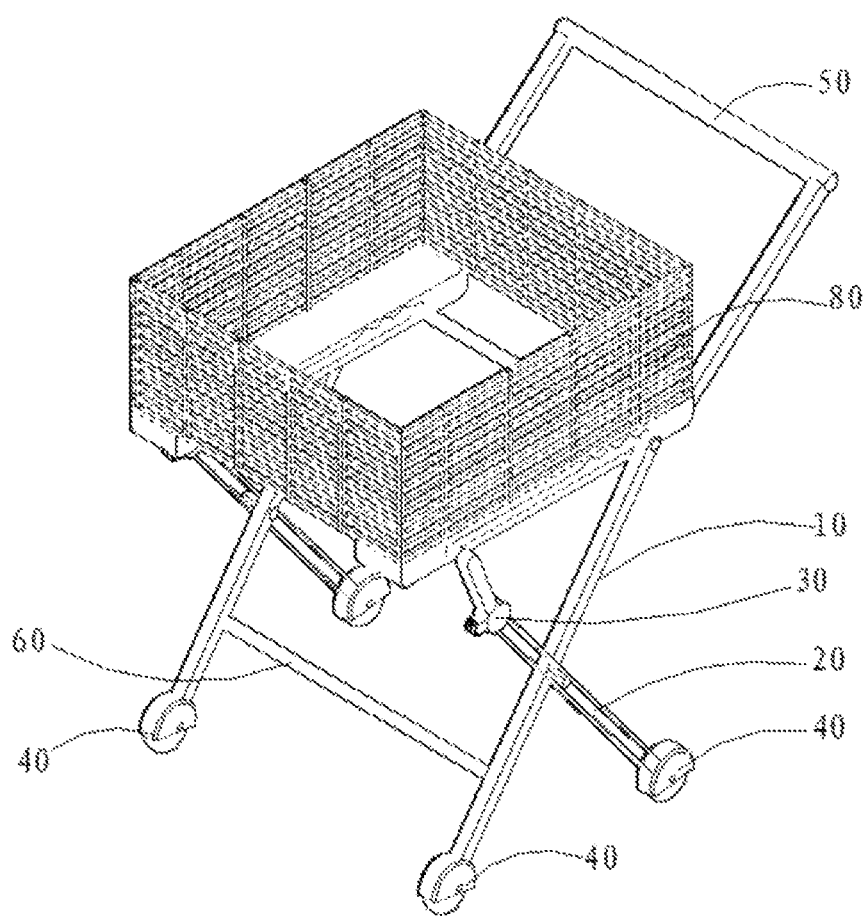
FIG. 2 is a structural schematic diagram of the shopping cart of FIG. 1 when mounted with a shopping basket.

Herein, the support seat 70 is installed with a handle frame 50, and as shown in FIG. 2, the support seat 70 is detachably installed thereon with a shopping basket 80. The shopping cart 100 of the present invention is additionally provided with the handle frame 50 and the shopping basket 80. The shopping basket 80 is preferably a foldable shopping basket 80, and is detachably connected with the support seat 70, to enhance the use function of the shopping cart 100 while maintaining a small volume, so as to increase the use value of the product and improve user comfort of the shopping cart 100.

Figure 8:
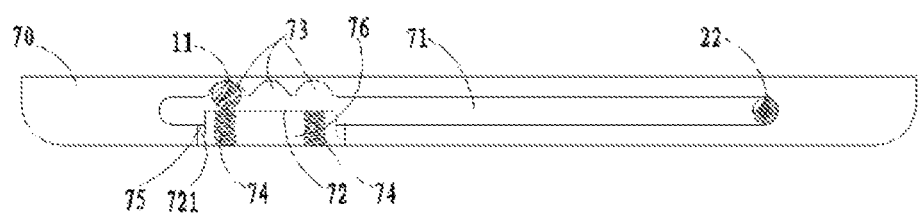
FIG. 8 is a structural schematic diagram of a track of the shopping cart of FIG. 1.

Referring also to FIG. 8, the shopping cart 100 of the present invention further comprises pressing units configured for pressing the support frame. The pressing units are close to the handle frame 50 and located at one end portion of the tracks 71. The pressing unit comprises the pressing member 72 and the first springs 74. The pressing member 72 can move perpendicular to a direction of the track 71. The first springs 74 are arranged between the pressing member 72 and the bottom of the support seat 70. The track 71, corresponding to the position of the pressing member 72, is provided with at least one clamping groove 73 for engaging the support frame. In an example of the present invention, the at least one clamping groove 73 comprises more than one clamping grooves, and three semi-circular clamping grooves 73 serially arranged on an upper side of the track 71 are schematically shown in the figure. A lower side of the track 71, corresponding to the positions of the clamping grooves 73, is provided with a recess 76. The recess 76 has a first flange 75. The pressing member 72 is embodied as a cover body, a rabbet of the cover body has a second flange 721, a bottom of the cover body is located outside the recess 76, the second flanges 721 are located in the recess 76, and the first springs 74 are located between the bottom of the cover body and the recess 76. Thus, since the tracks 71 are additionally provided with the clamping grooves 73, a first cross bar 11 is located in the clamping grooves 73 under pressure by the pressing member 72, which can prevent the phenomenon that the first cross bar 11 moves in the tracks 71 in the case of acceleration of the shopping cart, and improve the stability of the shopping cart of the present invention during movement.

The first support frame 10 comprises a first cross bar 11 and two first support rods 12 located at both ends of the first cross bar 11. One end of each of the two first support rods 12 is fixedly connected with the first cross bar 11, and the other end of each of the two first support rods 12 is installed with the wheels 40; the second support frame 20 comprises a second cross bar 21 and two second support rods 22 located at both ends of the second cross bar 21. One end of each of the two second support rods 22 is fixedly connected with the second cross bar 21, and the other end of each of the two second support rods 22 is installed with the wheels 40. Both the first cross bar 11 and the second cross bar 21 are installed in the tracks 71, the first support rod 12 and the second support rod 22 are rotatably connected with each other, and the first cross bar 11, compared to the second cross bar 21, is closer to the clamping grooves 73. A third cross bar 60 is connected between the two first support rods 12 or the two second support rods 22, so that the two first support rods or the two second support rods are fixed. The second support rod 22 comprises a first connecting rod 221, a second connecting rod 222 rotatably connected with the first connecting rod 221, and a rotation limiting structure 30. The first connecting rod 221 and the second connecting rod 222 are connected through the rotation limiting structure 30.

Figure 9:
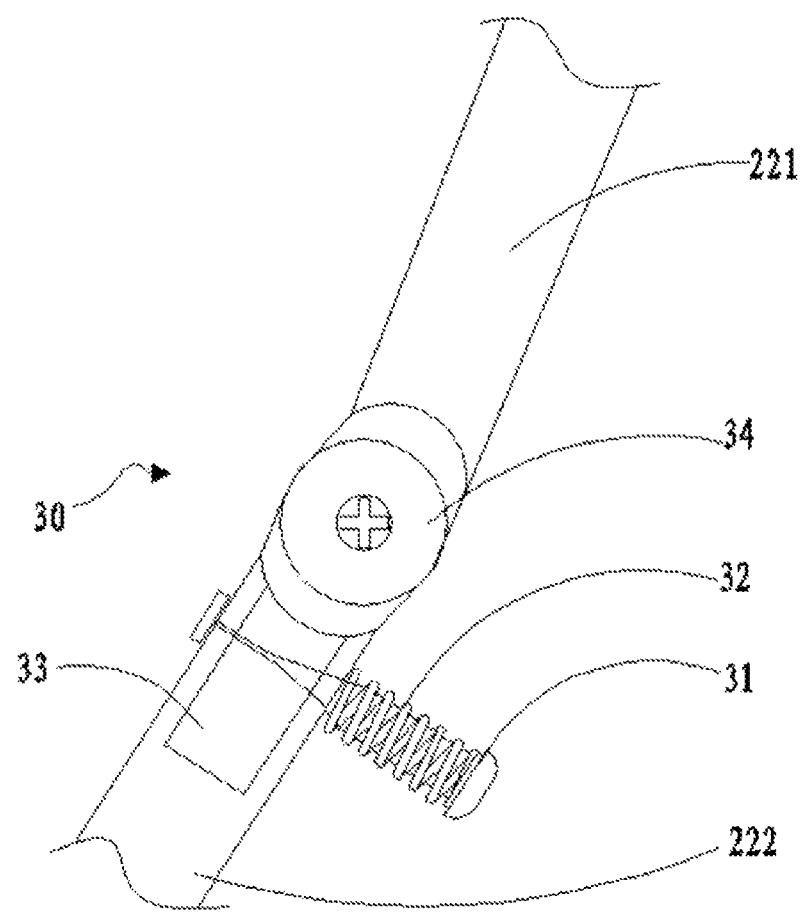
FIG. 9 is a structural schematic diagram of a rotation limiting structure of the shopping cart of FIG. 1.
Figure 10:
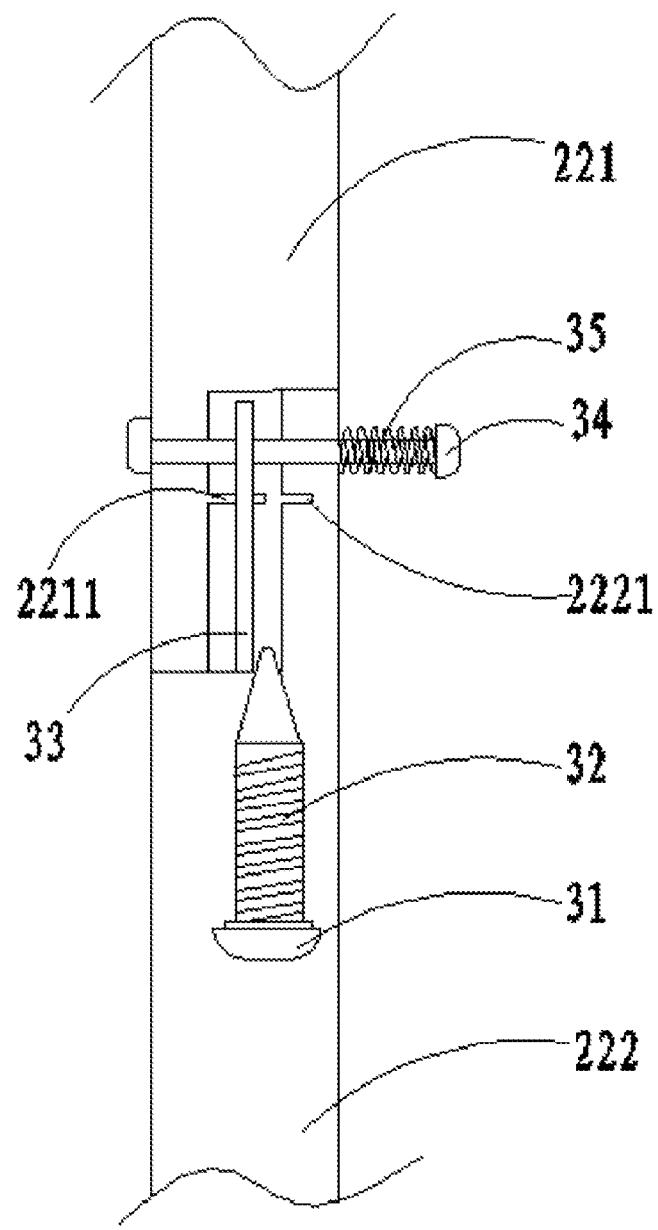
FIG. 10 is a side view of FIG. 9.

The rotation limiting structure 30 of the present invention is further described below. Referring also to FIG. 9 and FIG. 10, each of the second support rods 22 comprises the first connecting rod 221, the second connecting rod 222, a fastening rod 34, a second spring 32, an unlocking rod 31 and a third spring 35. Both the first connecting rod 221 and the second connecting rod 222 are provided with through holes configured for allowing the fastening rod 34 to pass through. The fastening rod 34 is located within the through holes and movable along the through holes. Both ends of the fastening rod 34 have a protrusion pressing against the through hole. The third spring 35 is sleeved on the fastening rod 34 and located between the protrusion and the first connecting rod 221 or the second connecting rod 222. The first connecting rod 221 has a locking element 2211, and the second connecting rod 222 has a locking hole 2221 matching the locking element 2211. The unlocking rod 31 has a diameter variation section, and the variation section is provided between the first connecting rod 221 and the second connecting rod 222, and presses against the first connecting rod 221 and the second connecting rod 222. The unlocking rod 31 has an end cover at one end. The second spring 32 is sleeved outside the unlocking rod 31, and located between the end cover and the first connecting rod 221 or the second connecting rod 222. When the unlocking rod 31 is pressed inwardly, the variation section moves inwardly to gradually separate the first connecting rod 221 from the second connecting rod 222, and the locking element 2211 from the locking hole 2221 to realize unlocking. In such a way, the first connecting rod 221 and the second connecting rod 222 are relatively rotatable. In one of the examples, a leaf spring 33 is arranged between the first connecting rod 221 and the second connecting rod 222, wherein the leaf spring 33 is rotatably connected with the locking element 2211. The diameter variation section is located between the leaf spring 33 and the second connecting rod 222. The leaf spring 33 presses the first connecting rod 221 in a horizontal direction to separate the first connecting rod 221 and the second connecting rod 222, while keeping still in a vertical direction, to cooperate with the unlocking rod 31 to achieve better unlocking effect, wherein the unlocking rod 31 can be downwardly and obliquely arranged, so as to be perpendicular to a trunk threshold 92, and by cooperating with the trunk threshold, more rapid unlocking can be achieved.

Figure 11:
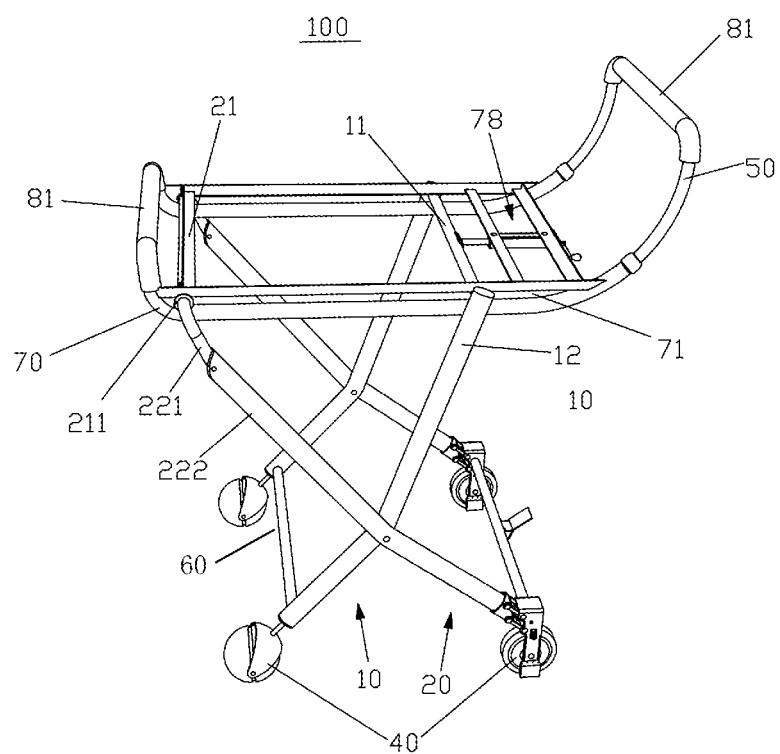
FIG. 11 is a structural schematic diagram of another shopping cart according to the present invention.

In another example, as shown in FIG. 11, the support seat 70 is formed by a U-shaped circular tube 701 and two angle irons 7011, wherein the U-shaped circular tube 701 comprises two vertical tube portions 7012 and a horizontal tube portion 7013, portions where the vertical tube portions 7012 are joined to the horizontal tube portion 7013 intersect are bent in parallel to each other, the angle irons 7011 are mounted on the U-shaped circular tube 701 and parallel to the vertical tube portions 7012, and two passages, i.e. tracks 71 of the support seat, are formed between the U-shaped circular tube 701 and the angle irons 7011 located above it. The first support frame 10 comprises a first cross bar 11 and two first support rods 12 located at both ends of the first cross bar 11, one end of each of the two first support rods 12 is fixedly connected with the first cross bar 11, and the other end of the two first support rods 12 is installed with the wheel 40. The second support frame 20 comprises a second cross bar 21 and two second support rods 22 located at both ends of the second cross bar 21, one end of each of the two second support rods 22 is fixedly connected with the second cross bar 21, and the other end of each of the two second support rods 22 is installed with the wheel 40. Both the first cross bar 11 and the second cross bar 21 are installed in the tracks 71 and slidable within the tracks 71. The second support rod 22, which is in form of an oval tube, comprises a first connecting rod 221 and a second connecting rod 222 rotatably connected with the first connecting rod 221 and having an arc-shape cut 2222 at an upper end. The second cross bar 21 and the first connecting rods 221 are circular tube-shaped and formed integrally, and form an angle with each other, and by inserting the first connecting rods 221 into the arc-shape cut 2222 at the upper ends of the second connecting rods 222 and horizontally fixing by rivets, the second cross bar 21 is rotatably connected with the second connecting rods 222. The first support rods 12 and the second support rods 22 are horizontally fixed by rivets and rotatably connected together. A third cross bar 60 is connected between the two first support rods 12, so that the two first support rods are fixed.

Figure 13:
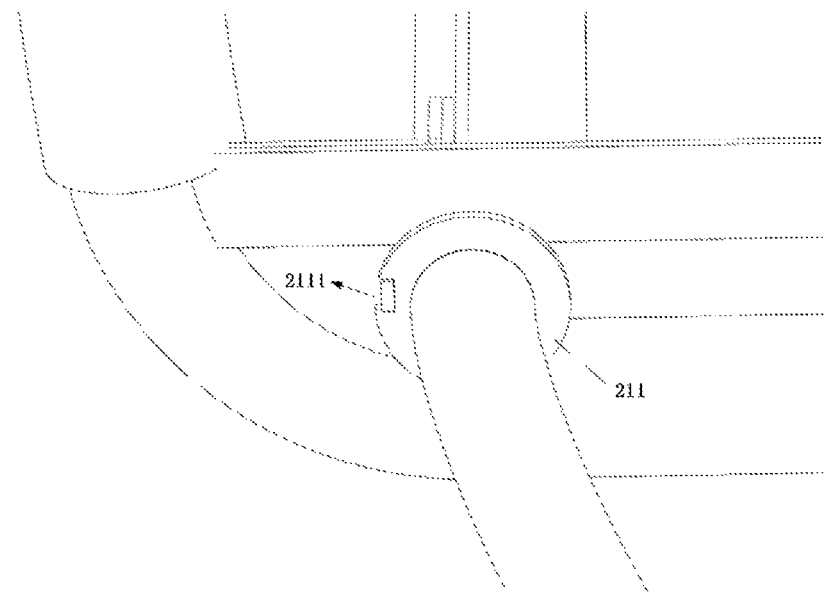
FIG. 13 is an enlarged view of a left circular position-limiting sliding block of the shopping cart of FIG. 11.

As shown in FIG. 13, the second cross bar 21 is provided with a left circular position-limiting sliding block 211 and a right circular position-limiting sliding block (not shown in the figure), respectively, at outer edges of the angle irons 7011 at a left side and a right side, and the left circular position-limiting sliding block 211 and the right circular position-limiting sliding block are fixedly connected with the second cross bar 21 through welding. Gaps 2111 are provided at front portions of the left and right circular position-limiting sliding blocks, respectively, and fit with square latches fixed on the angle irons 7011, so as to limit rotation of the second cross bar 21 when it is at the leftmost position of the tracks 71, and moreover, this connection can be relieved when needed, so as to allow the second cross bar 21 to slide within the tracks 71.

Figure 14:
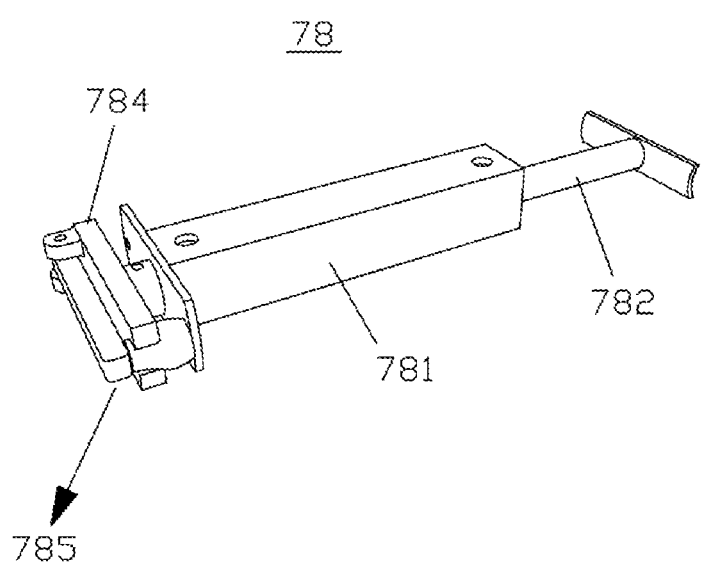
FIG. 14 is a structural schematic diagram of a height regulating device of the shopping cart of FIG. 11 when not in use.
Figure 15:
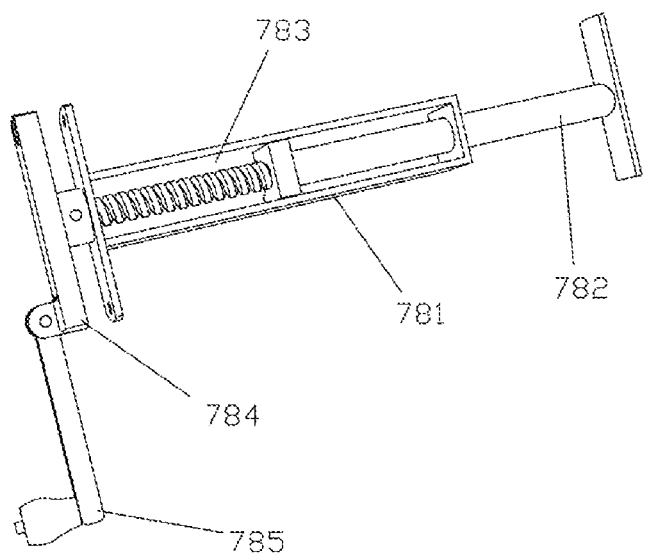
FIG. 15 is a structural schematic diagram of the height regulating device of the shopping cart of FIG. 11 when in used.
Figure 16:
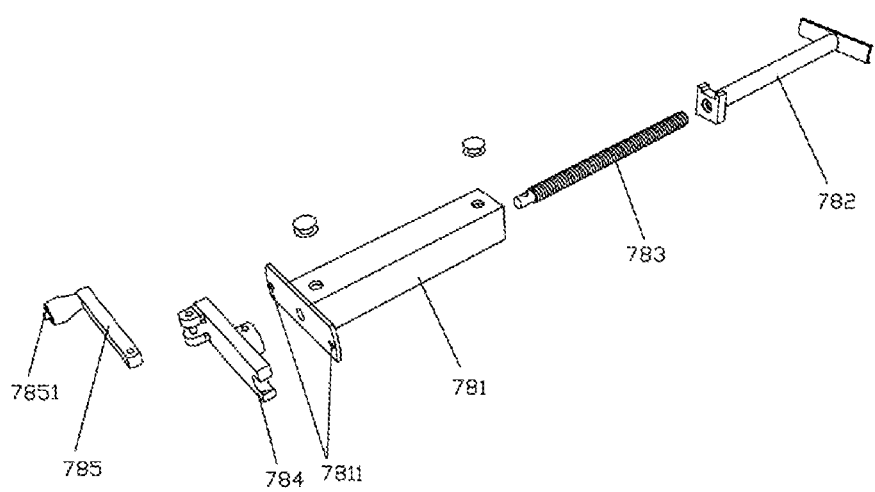
FIG. 16 is an exploded structural schematic diagram of the height regulating device of the shopping cart of FIG. 11.

As shown in FIG. 14 to FIG. 16, the shopping cart 100 further comprises a height regulating device 78. The height regulating device 78 comprises an upright base 781, a retractable arm 782, a screw rod 783, a swing arm base 784 and a swing arm 785, wherein the upright base 781 is fixedly connected onto the angle irons 7011 of the support seat 70; the retractable arm 782 is composed of a tetragonal nut, a circular tube and an arc-shaped pushing arm which are fixedly connected; the radius of a tail end of the screw rod is smaller than that of a main body of the screw rod; the swing arm base 784 is fixedly connected with the screw rod 783 passing through the upright base 781 and can rotate relative to the upright base 781; and the swing arm 785 and the swing arm base 784 are rotatably connected. A notch for fixing the swing arm is provided at one end of the swing arm base 784, so that free rotation of the swing arm can be prevented by inserting a handle of the swing arm 785 into the notch to fix the swing arm 785 when the swing arm 785 does not need to be used. A protruding pin 7851 is provided on the handle of the swing arm 785, and a bottom plate of the upright base 781 is provided with two pin holes 7811 configured for insertion of the protruding pin 7851. When the swing arm 785 is not used, the protruding pin 7851 may be inserted into any one of the pin holes 7811, so as to fix the swing arm, which further prevents free rotation of the swing arm, thus avoiding disturbing the normal use of the shopping cart, and further improving the use, safety, and stability of the shopping cart. Moreover, the height regulating device 78 may regulate a distance between the first cross bar 11 and the second cross bar 21 to regulate a cross angle between the first support frame 10 and the second support frame 20, so as to change the height of the support seat. In this way, the shopping cart may be adapted to heights of various types of vehicle trunks, greatly broadening the range of application of the shopping cart. A lock hook is provided at the middle of the first cross bar 11, and the lock hook is configured to hook the arc-shaped pushing arm of the height regulating device 78, so as to fix the height regulating device 78, thus preventing possible fall-off of the height regulating device 78.

Figure 12:
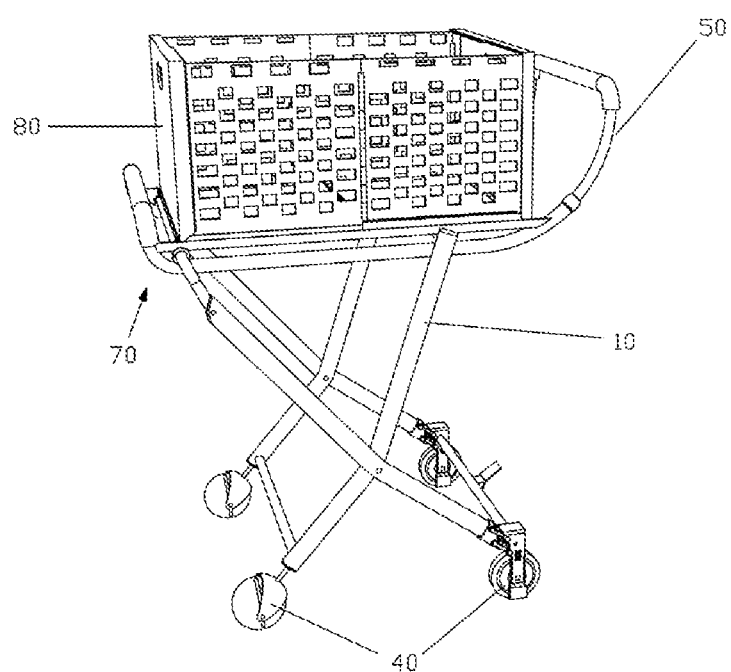
FIG. 12 is a structural schematic diagram of the shopping cart of FIG. 11 when being mounted with a shopping basket.
Figure 17:
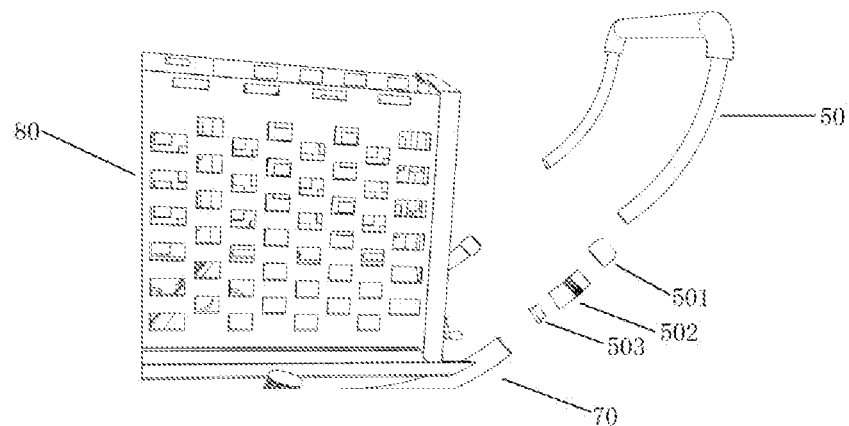
FIG. 17 is an exploded structural schematic diagram of the shopping cart in FIG. 11 when being mounted with a handle frame.
Figure 18:
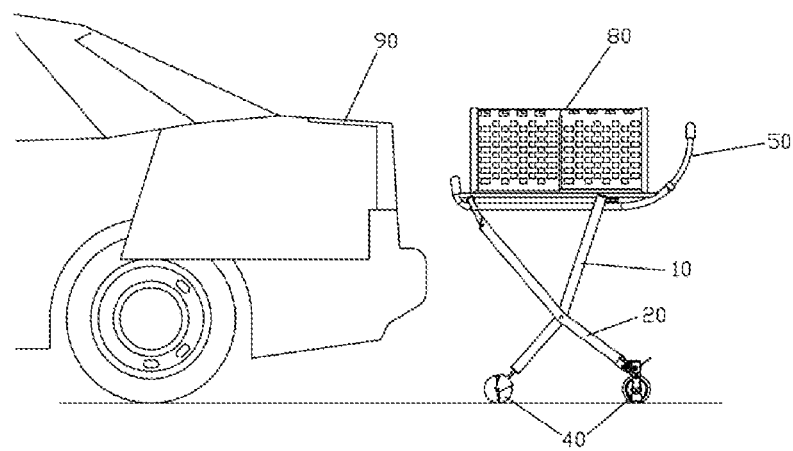
FIG. 18 is a schematic diagram of the shopping cart of FIG. 11 when being pushed into a trunk of a vehicle.
Figure 19:
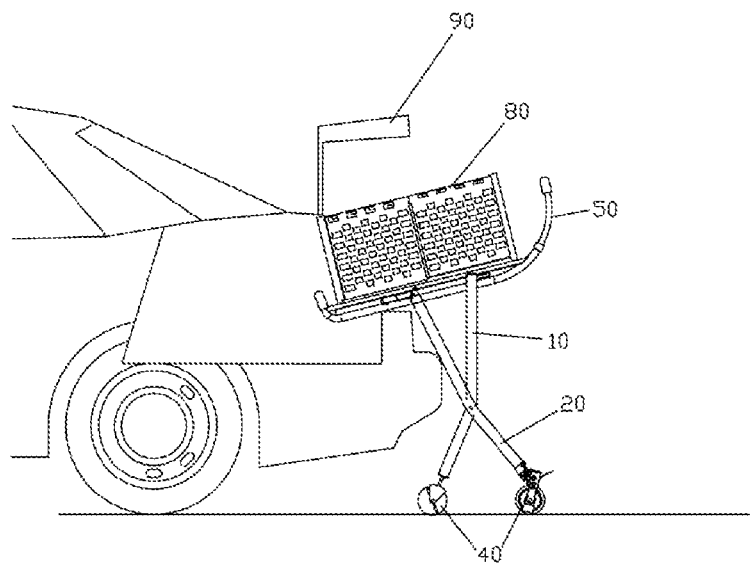
FIG. 19 is a schematic diagram of the shopping cart of FIG. 11 when being inclined towards a trunk of a vehicle.
Figure 20:
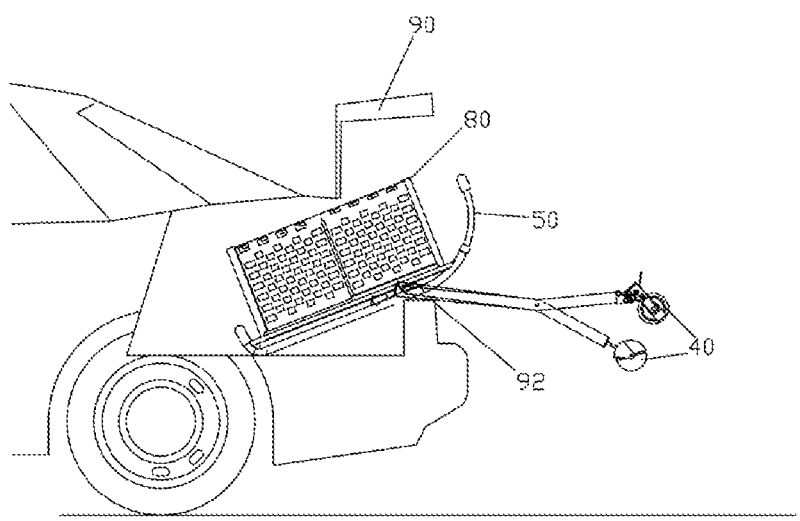
FIG. 20 is a schematic diagram of the shopping cart of FIG. 11 when partially entering into a trunk of a vehicle.
Figure 21:
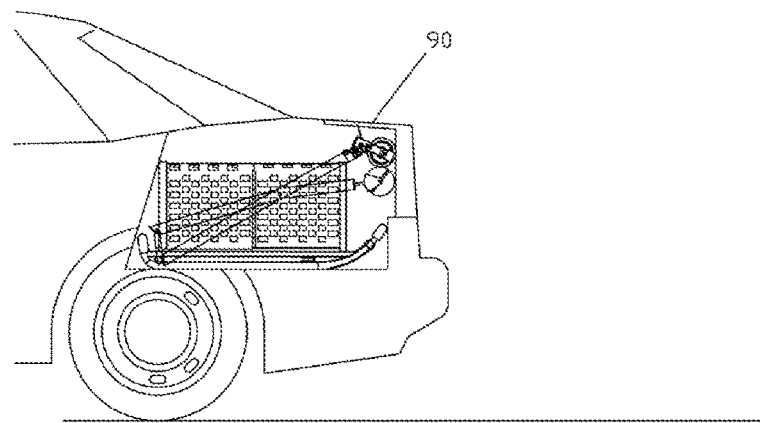
FIG. 21 is a schematic diagram of the shopping cart of FIG. 11 when completely entering into a trunk of a vehicle.
Figure 22:
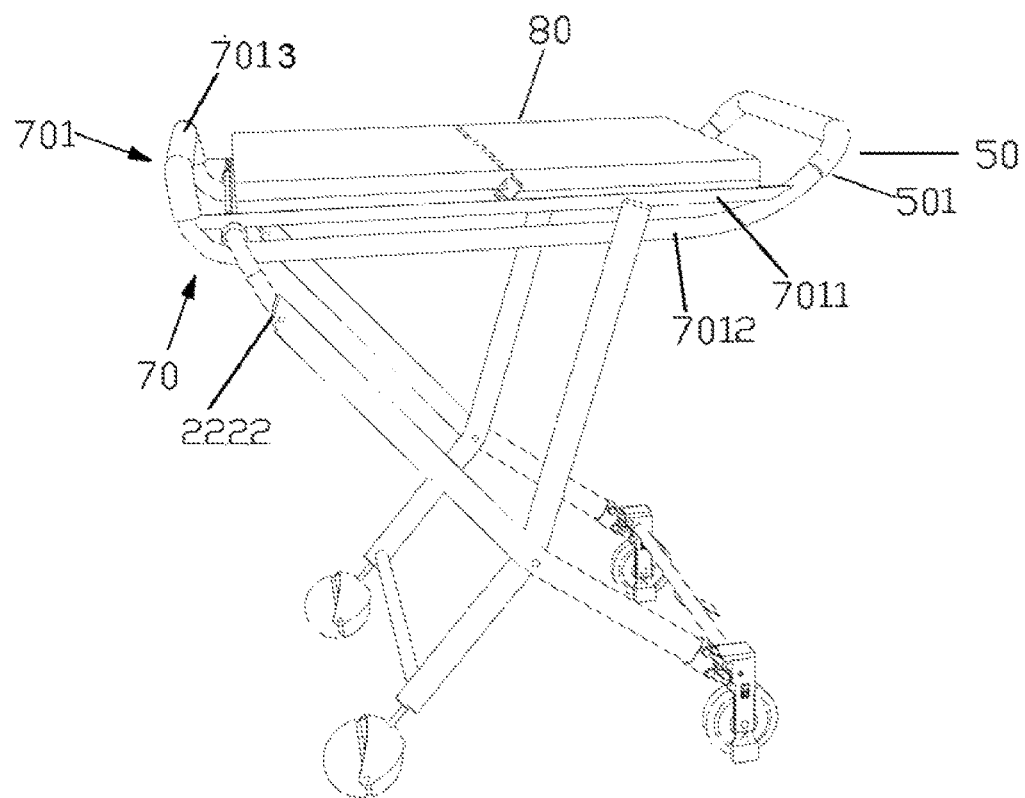
FIG. 22 is a schematic diagram of the shopping cart of FIG. 11 when used as a table.

In this example, as shown in FIG. 12, a foldable shopping basket 80 and a retractable handle frame 50 are detachably installed on the support seat 70. The handle frame 50 is made of a bent circular tube with a radius smaller than those of the vertical tube portions 7012 of the support seat 70, and as shown in FIG. 17, the handle frame 50 is fixed on the support seat through fixing seats 502 and fastening nuts 501, and an anti-loosening stopper 503 is further provided between the handle frame 50 and the support seat 70, so as to prevent the handle frame from escaping from the support seat when it does not need to be pulled out. When the handle frame 50 is in a retracted state, the volume of the shopping cart is further decreased, so that it can be more conveniently placed in a small space such as a vehicle trunk. As shown in FIG. 22, when the handle frame 50 is in a retracted state, i.e. retracted into the support seat 70 and the shopping basket 80 is in a folded state, this shopping cart also can be used as a small table, which further increases the use functions of the shopping cart and improves its use value.

Besides, in the shopping cart 100 of the present application, both the handle frame 50 and the horizontal tube portion 7013 of the U-shaped circular tube 701 of the support seat 70 are wrapped with foam sponge 81, wherein the foam sponge wrapped on the horizontal tube portion 7013 of the U-shaped circular tube 701 of the support seat 70 can be used for buffering and preventing collision; and the foam sponge wrapped on the handle frame can be used for preventing slip, which further improves the use and safety of the shopping cart 100.

Figure 3:
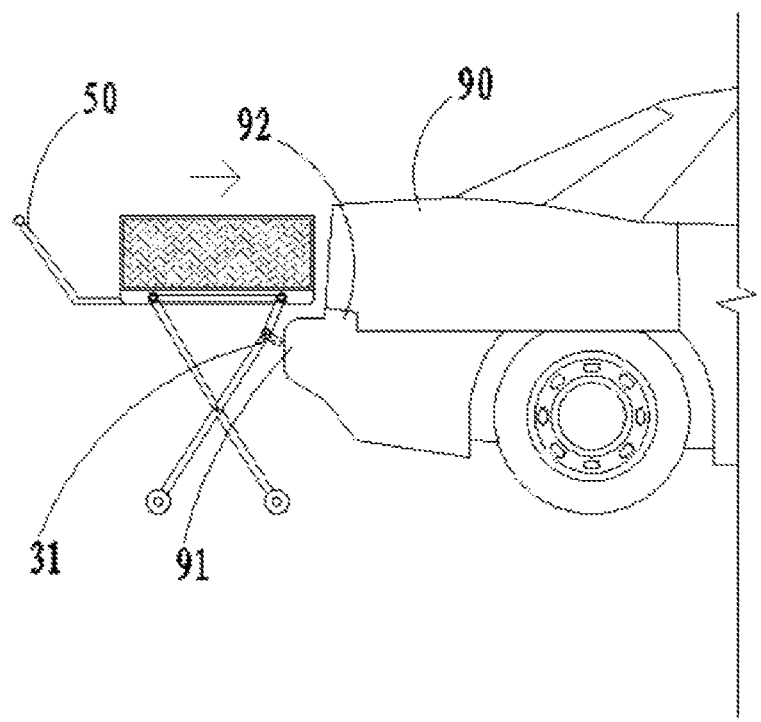
FIG. 3 is a schematic diagram of the shopping cart of FIG. 1 when being pushed into a trunk of a vehicle.
Figure 4:
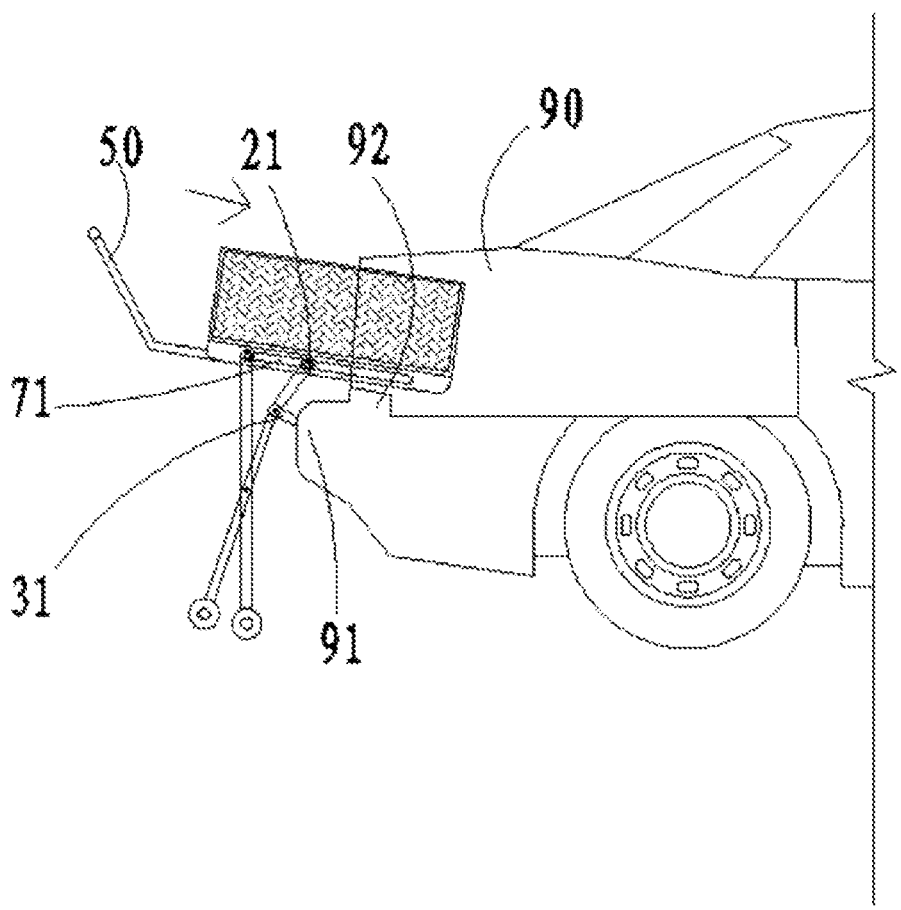
FIG. 4 is a schematic diagram of the shopping cart of FIG. 1 when partially pushed into a trunk of a vehicle.
Figure 5:
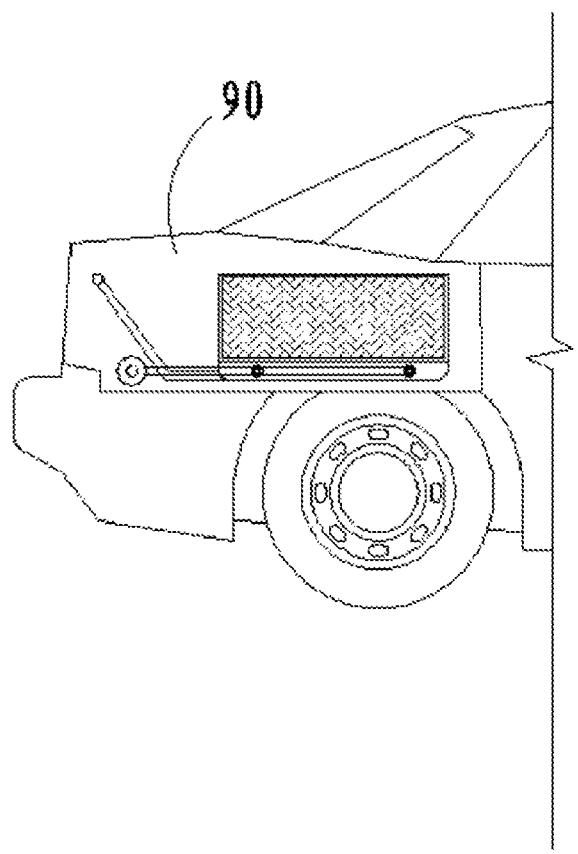
FIG. 5 is a schematic diagram of the shopping cart of FIG. 1 when completely pushed into a trunk of a vehicle.
Figure 6:
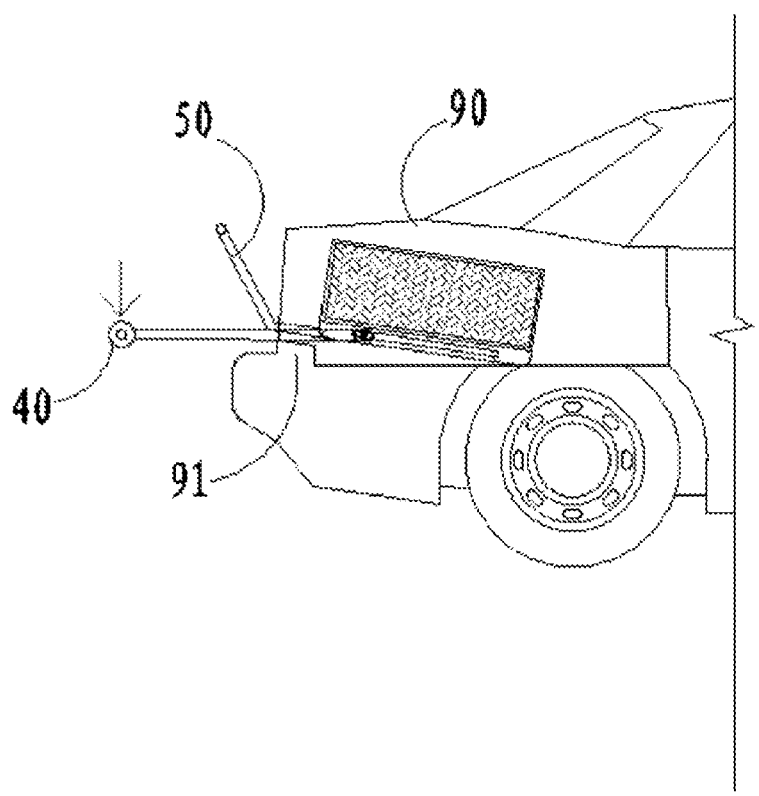
FIG. 6 is a schematic diagram of the shopping cart of FIG. 1 when being taken out from a trunk of a vehicle.
Figure 7:
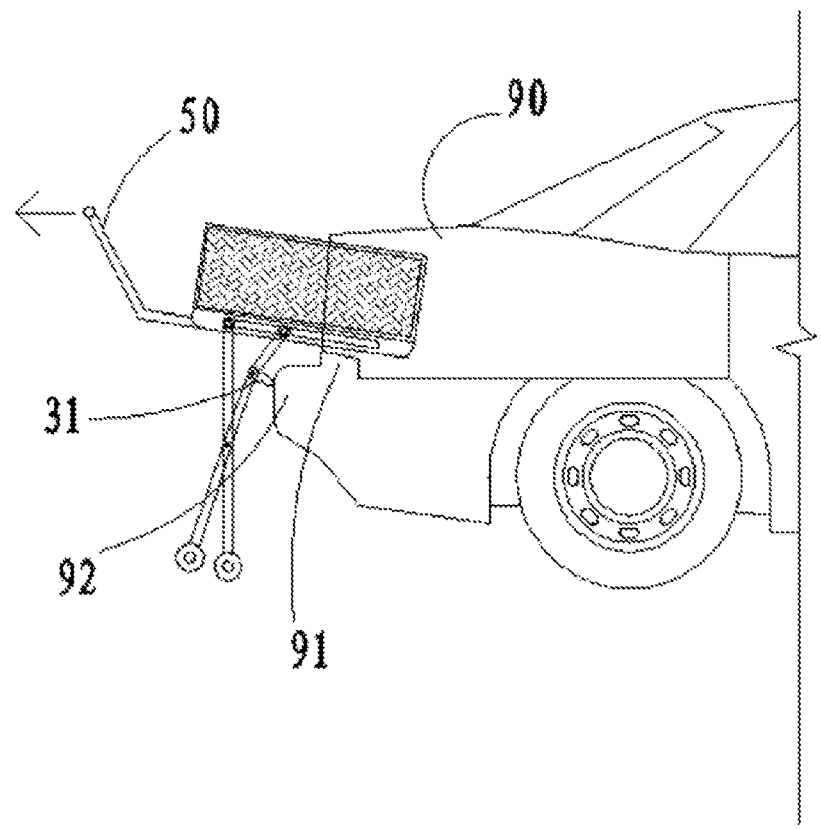
FIG. 7 is a schematic diagram of the shopping cart of FIG. 1 when being taken out from a trunk of a vehicle and landed.

In summary, the present invention has the following advantages:

1. In the present invention, the support frame is composed of a first support frame 10 and a second support frame 20 in rotatable connection. The tops of the first support frame 10 and the second support frame 20 are movable along the tracks 71. By moving the tops of the first support frame 10 and the second support frame 20 respectively to two ends of the tracks 71 to press against the two ends of the tracks 71 and placing goods on the support seat 70, the goods can be carried freely without the use of handbags, greatly saving physical strength and being convenient and efficient; and when not being used, the shopping cart of the present invention can be folded and placed in a trunk 90 of a vehicle for later use, thus occupying small room due to the small size and being convenient to carry.
2. The shopping cart of the present invention is additionally provided with the handle frame 50 and the shopping basket 80. The shopping basket 80 is preferably a foldable shopping basket 80, and is detachably connected with the support seat 70, to enhance the use function of the shopping cart while maintaining a small volume, so as to increase the use value of the product, and improve user comfort of the shopping cart.
3. In one aspect, the second support rod 22 of the second support frame 20 comprises the first connecting rod 221 and the second connecting rod 222. The first connecting rod 221 and the second connecting rod 222 are rotatably connected and provided with the rotation limiting structure at a joint thereof. By connecting the first connecting rod 221 and the second connecting rod 222 through the rotation limiting structure, the first connecting rod 221 and the second connecting rod 222 are locked. When the goods need to be transported to the trunk 90 of the vehicle, as shown in FIG. 3, the shopping cart can be pushed to a place close to the trunk 90 of the vehicle, and the unlocking rod 31 of the rotation limiting structure is pushed and pressed on a trunk lid rubber gasket 91 of the trunk 90 of the vehicle, so that the rotation limiting structure is unlocked, and the first connecting rod 221 and the second connecting rod 222 rotate relatively, as shown in FIG. 4, while the front end of the support seat 70 inclines towards the trunk 90 of the vehicle and presses against the trunk threshold 92, the shopping basket 80 of the shopping cart is further pushed into the trunk 90 of the vehicle. Meanwhile, after the second cross bar 21 moves towards the first cross bar 11 along the tracks 71, and the shopping cart is pushed into the trunk 90 of the vehicle, the first cross bar 11 and the second cross bar 21 along the tracks 71 are further pushed thereinto, as shown in FIG. 5, thus completing all the steps of putting the shopping cart into the trunk 90 of the vehicle. When the shopping cart needs to be taken out from the trunk 90 of the vehicle, referring also to FIG. 6 and FIG. 7, the first support rod 12 and the second support rod 22 at two sides of the shopping basket 80 are picked up and pulled out along the tracks. It shall ensure that the unlocking rod 31 presses on the trunk lid rubber gasket 91, and a rear portion of the shopping basket 80 is pulled up by taking the support frame as a lever and the trunk threshold 92 as a support point, to make the shopping basket higher than the trunk threshold 92 and placed on the trunk threshold 92 by slightly pulling it outwardly. While the support frame is gently put down on the ground, the handle frame 50 is pulled and the third cross bar 60 is pushed forwards with a foot, to make the shopping basket 80 slide out from the trunk 90 of the vehicle, and the support frame is automatically open forwardly along the tracks due to the gravity of the shopping basket 80 itself.

In another aspect, the shopping cart 100 is provided with the height regulating device 78; the second cross bar 21 of the second support frame 20 and the first connecting rods 221 are circular tube-shaped and formed integrally, and form an angle with each other, and the first connecting rods 221 are inserted into the arc-shape cuts 2222 at the upper portions of the second connecting rods 222, the second cross bar 21 is provided with the left circular position-limiting sliding block and the right circular position-limiting sliding block, respectively, at outer edges of the angle irons 7011 at a left side and a right side; moreover, the handle frame 50 of the shopping cart 100 is retractable. As shown in FIG. 18 to FIG. 21, when the goods need to be transferred to a trunk of a vehicle, the shopping cart can be pushed to a place close to the trunk 90 of the vehicle, and when the trunk 90 of the vehicle is opened, the height regulating device 78 is used to allow the shopping cart to be adapted to the height of the trunk 90 of the vehicle, then the left circular position-limiting sliding block 211 and the right circular position-limiting sliding block are separated from the square latches on the angle irons 7011 of the support seat, and then the first connecting rods 221 rotate to be parallel to the tracks, and drives the second cross bar 21 to slide along the tracks 71 towards the direction of the first cross bar 11, and in this situation, the front end of the support seat is inclined towards the trunk 90 of the vehicle, and presses against the trunk threshold 92. After the shopping cart is pushed into the trunk 90 of the vehicle, the handle frame 50 is retracted, and then the first cross bar 11 and the second cross bar 21 are enabled to slide along the tracks 71 towards the horizontal front portion of the circular tube of the support seat, thus completing all the steps of putting the shopping cart into the trunk 90 of the vehicle.

Thus, the shopping cart of the present invention is not only able to facilitate the transportation of the goods and occupy small space due to being foldable, but also is able to conveniently cooperate with the trunk 90 of the vehicle to be put into the trunk 90 of the vehicle and also to be easily taken out from the trunk 90 of the vehicle. Therefore, it can greatly save manpower and material sources, and has extremely good market prospect.

The above examples merely show specific embodiments of the present invention, and the description thereof is quite specific and particular, but they should not be construed as limiting the patent scope of the present invention. It should be indicated that a person ordinarily skilled in the art still can make several variations and improvements, without departing from the concept of the present invention, and all of these fall within the scope of protection of the present invention.

The invention claimed is:

1. A shopping cart, comprising:
 a support seat and a support frame supporting the support seat, wherein:
 the support seat is provided therein with tracks;
 the support frame comprises a first support frame and a second support frame;
 the first support frame and the second support frame are disposed across from each other and rotatably connected;
 both bottoms of the first support frame and both bottoms of the second support frame are installed with wheels;
 a top of the first support frame and a top of the second support frame are both installed in the tracks, and both the top of the first support frame and the top of the second support frame are movable along the tracks;
 the support seat is formed by a U-shaped circular tube and two angle irons;
 the U-shaped circular tube comprises two vertical tube portions and a horizontal tube portion, the vertical tube portions are bent in parallel to each other where joined to the horizontal tube portion;
 the angle irons are mounted on the U-shaped circular tube and parallel to the vertical tube portions;
 a handle frame is mounted at an open end of the U-shaped circular tube;
 the first support frame comprises a first cross bar and two first support rods located at both ends of the first cross bar, one end of each of the two first support rods is fixedly connected with the first cross bar, and the other end of each of the two first support rods is installed with one of the wheels;
 the second support frame comprises a second cross bar and two second support rods located at both ends of the second cross bar, one end of each of the two second support rods is fixedly connected with the second cross bar, and the other end of each of the two second support rods is installed with one of the wheels;
 both the first cross bar and the second cross bar are installed in the tracks and slidable within the tracks;
 the second support rod is an oval tube, and comprises a first connecting rod and a second connecting rod rotatably connected with the first connecting rod and having an arc-shape cut at an upper end;
 the second cross bar and the first connecting rods are circular tube-shaped and formed integrally, and form an angle with each other; and
 by inserting the first connecting rods into the arc-shape cut at the upper ends of the second connecting rods and horizontally fixing by rivets, the second cross bar is rotatably connected with the second connecting rods.

2. The shopping cart according to claim 1, wherein the support seat is installed with the handle frame; the shopping cart further comprising pressing units pressing the support frame, and the pressing units are close to the handle frame and located at one end portion of each of the tracks.

3. The shopping cart according to claim 2, wherein the pressing unit comprises a pressing member and first springs, the pressing member is movable perpendicularly to a direction of the track, the first springs are arranged between the pressing member and the support seat, and the track, corresponding to the position of the pressing member is provided with at least one clamping groove engaging the support frame.

4. The shopping cart according to claim 3, wherein the at least one clamping groove comprises more than one clamping grooves serially arranged on an upper side of the track, a lower side of the track corresponding to the positions of the clamping grooves is provided with a recess, the recess has a first flange, the pressing member is embodied as a cover body, a rabbet of the cover body has a second flange, a bottom of the cover body is located outside the recess, the second flanges are located in the recess, and the first springs are located between the bottom of the cover body and the recess.

5. The shopping cart according to claim 3, wherein the first support frame comprises a first cross bar and two first support rods located at both ends of the first cross bar, one end of each of the two first support rods is fixedly connected with the first cross bar, and the other end of each of the two first support rods is installed with the wheels; the second support frame comprises a second cross bar and two second support rods located at both ends of the second cross bar, one end of each of the two second support rods is fixedly connected with the second cross bar, and the other end of each of the two second support rods is installed with the one of the wheels; and both the first cross bar and the second cross bar are installed in the tracks, the first support rod and the second support rod are rotatably connected with each other, and the first cross bar, compared to the second cross bar, is closer to the clamping grooves.

6. The shopping cart according to claim 5, wherein the second support rod comprises a first connecting rod, a second connecting rod rotatably connected with the first connecting rod, and a rotation limiting structure, and the first connecting rod and the second connecting rod are connected through the rotation limiting structure.

7. The shopping cart according to claim 5, wherein each of the second support rods comprises the first connecting rod, the second connecting rod, a fastening rod, a second spring, an unlocking rod and a third spring;
both the first connecting rod and the second connecting rod are provided with through holes allowing the fastening rod to pass through, the fastening rod is located within the through holes and movable along the through holes, both ends of the fastening rod have a protrusion pressing against the through hole, the third spring is sleeved on the fastening rod and located between the protrusion and the first connecting rod or the second connecting rod, the first connecting rod has a locking element, and the second connecting rod has a locking hole matching the locking element; and
the unlocking rod has a diameter variation section, and the variation section is provided between the first connecting rod and the second connecting rod, and presses against the first connecting rod and the second connecting rod; and the unlocking rod has an end cover at an end, and the second spring is sleeved outside the unlocking rod, and located between the end cover and the first connecting rod or the second connecting rod.

8. The shopping cart according to claim 5, wherein a leaf spring is arranged between the first connecting rod and the second connecting rod, the leaf spring and the locking element are rotatably connected with each other, and the diameter variation section is located between the locking element and the second connecting rod.

9. The shopping cart according to claim 5, wherein a third cross bar is connected between the two first support rods or between the two second support rods.

10. The shopping cart according to claim 1, wherein the support seat is detachably installed thereon with a shopping basket.

11. The shopping cart according to claim 1, wherein the first support rods and the second support rods are horizontally fixed by rivets and rotatably connected together, and a third cross bar is connected between the two first support rods.

12. The shopping cart according to claim 1, wherein the second cross bar is provided with a left circular position-limiting sliding block and a right circular position-limiting sliding block, respectively, at outer edges of the angle irons at a left side and a right side, and the left circular position-limiting sliding block and the right circular position-limiting sliding block are fixedly connected with the second cross bar through welding.

13. The shopping cart according to claim 1, wherein the shopping cart further comprises a height regulating device, the height regulating device comprises an upright base, a retractable arm, a screw rod, a swing arm base and a swing arm, wherein the upright base is fixedly connected onto the angle irons of the support seat; the retractable arm is composed of a tetragonal nut, a circular tube and an arc-shaped pushing arm which are fixedly connected; a radius of a tail end of the screw rod is smaller than that of a main body of the screw rod; the swing arm base is fixedly connected with the screw rod passing through the upright base and is rotatable relative to the upright base; and the swing arm and the swing arm base are rotatably connected.

14. The shopping cart according to claim 1, wherein a lock hook is provided at the middle of the first cross bar, and the lock hook the arc-shaped pushing arm of the height regulating device.

15. The shopping cart according to claim 14, wherein a protruding pin is provided on a handle of the swing arm, and a bottom plate of the upright base is provided with two pin holes receiving the protruding pin.

16. The shopping cart according to claim 1, wherein a foldable shopping basket is detachably installed on the support seat, and the handle frame is retractable.

17. The shopping cart according to claim 16, wherein the handle frame is made of a bent circular tube with a radius smaller than those of the vertical tube portions of the support seat, the handle frame is fixed on the support seat through fixing seats and fastening nuts, and an anti-loosening stopper is provided between the handle frame and the support seat.

18. The shopping cart according to claim 17, wherein both the handle frame and the horizontal tube portion of the U-shaped circular tube of the support seat are wrapped with foam sponge.

* * * * *